US005446588A

United States Patent [19]
Missig et al.

[11] Patent Number: 5,446,588
[45] Date of Patent: Aug. 29, 1995

[54] WIDE-ANGLE EYEPIECE OPTICAL SYSTEM EMPLOYING REFRACTIVE AND DIFFRACTIVE OPTICAL ELEMENTS

[75] Inventors: Michael D. Missig, Cleveland, Ohio; G. Michael Morris, Fairport, N.Y.

[73] Assignee: The University of Rochester, Rochester, N.Y.

[21] Appl. No.: 283,001

[22] Filed: Jul. 29, 1994

[51] Int. Cl.[6] .................. G02B 5/18; G02B 25/00; G02B 27/44
[52] U.S. Cl. .................... 359/565; 359/566; 359/645
[58] Field of Search .............. 359/355, 356, 357, 565, 359/566, 569, 645

[56] References Cited

U.S. PATENT DOCUMENTS

| 1,478,704 | 12/1923 | Erfle . | |
|---|---|---|---|
| 4,525,035 | 6/1985 | Nagler . | |
| 5,013,133 | 5/1991 | Buralli et al. | 359/565 |
| 5,044,706 | 9/1991 | Chen | 359/357 |
| 5,148,314 | 9/1992 | Chen . | |
| 5,151,823 | 9/1992 | Chen . | |
| 5,229,880 | 7/1993 | Spencer et al. | 359/566 |
| 5,257,133 | 10/1993 | Chen | 359/356 |
| 5,287,218 | 2/1994 | Chen | 359/565 |
| 5,349,471 | 9/1994 | Morris et al. | 359/565 |

OTHER PUBLICATIONS

*Optical Design–Military Standardization Handbook MIL-HDBK-141* (Defense Supply Agency, Washington, D.C., 1962), p. 14–1.

W. J. Smith, *Modern Optical Engineering Second Ed.* (McGraw-Hill, Inc., New York, 1990), pp. 404–407.

R. Kingslake, *Lens Design Fundamentals* (Academic Press, New York, 1978), p. 335.

D. Williamson, "The eye in optical systems," in *Geometrical Optics*, Robert E. Fischer, ed. Proc. SPIE, 531, 136–147 (1985).

T. W. Stone, "Hybrid Diffractive-Refractive Telescope," in *Practical Holography IV*, Stephen A. Benton, ed. Proc. SPIE, 1212, 257–266 (1990).

S. Rosin, *Applied Optics and Optical Engineering, vol. III Optical Components*, R. Kingslake, ed. (Academic Press, Inc., New York, 1965), ch. 9, p. 340.

*Primary Examiner*—Martin Lerner
*Attorney, Agent, or Firm*—M. Lukacher

[57] ABSTRACT

Eyepiece optical systems having arrangements of surfaces where light is refracted or diffracted provide eyepieces with fewer elements and more compact designs than comparable, conventional eyepiece designs. These eyepiece optical systems have three elements each with positive focussing power, and provide a wide field-of-view of about 70° and an eye relief of approximately 80% of the total focal length of the eyepiece. One embodiment has (from the eye side) a refracting, meniscus, positive element with a surface concave toward the eye, a bi-convex element having a refracting convex surface and a second refracting convex surface, and a refractive/diffractive doublet element with a refracting convex surface and diffracting surface (each element being of positive power). Another embodiment, from the eye side has a first diffractive/refractive doublet having a diffracting surface and a convex refracting surface, an equi-convex element having two refracting convex surfaces and a second refracting/diffracting element having a diffracting surface and a convex refracting surface.

15 Claims, 5 Drawing Sheets

WIDE-ANGLE EYEPIECE OPTICAL SYSTEM EMPLOYING REFRACTIVE AND DIFFRACTIVE OPTICAL ELEMENTS

This invention relates generally to eyepiece optical systems, and more specifically to a wide-angle eyepiece optical system employing refractive and diffractive optical elements.

An eyepiece is used in a variety of optical instruments to view an image at a comfortable distance with an increased angular subtense. In conjunction with the other components of an optical system, an eyepiece provides magnifying power. Typical applications for eyepieces are binoculars, telescopes, and microscopes. In these types of systems, a front-end subsystem (usually an objective lens, which includes the system entrance pupil) views a distant object and forms an internal image within the instrument. The system entrance pupil collects the light from the object. The entrance pupil is the limiting aperture for the light entering the optical system. The internal image is then viewed by a back-end subsystem known as an eyepiece.

The eyepiece essentially has two functions. First, the eyepiece forms an enlarged image of the internal image at a distance which is comfortable for the user. In other words, the internal image formed by the objective is usually quite small and actually very close to the eye of the observer. The eyepiece re-images that internal-image at a distance that is comfortable for the user so as to reduce eyestrain. The eyepiece forms that image with a significantly increased angular subtense, so as to provide magnification. The second task of the eyepiece is to provide a system exit pupil. The eyepiece then actually performs a second imaging operation, namely that of imaging the system entrance pupil. Therefore the eyepiece is required to not only re-image the internal image of the overall optical instrument, but it has the added task of imaging the system entrance pupil to the exit pupil. To maximize the light throughput of an overall system when two sub-systems are connected, the second system must be joined with the first system at the exit pupil of the first with the entrance pupil of the second. For this reason the pupil of the eye must be positioned at the exit pupil of a visual instrument. Due to the functions of each subsystem within the visual instrument, the eyepiece subsystem is often the limiting factor in optical performance.

There are several requirements for an eyepiece system that result from the functions stated above. As was mentioned, the exit pupil is the location at which the user must place his or her eye to view the full field without unnecessary vignetting. This exit pupil must be located at a sufficient distance from the last physical surface to allow for clearance (e.g. eyeglasses, etc.) and for comfort. This distance from the last lens surface to the exit pupil is known as the eye relief of the eyepiece. Eyepiece designers are presented with the problem of simultaneously providing a large field-of-view, a long eye relief, and well-corrected aberrations; for example, maintaining the aberration-correction of the eyepiece by increasing the field angle reduces the eye relief. Also, as the eye relief is maintained for increasing field angle, the aperture sizes of the elements must be increased, which severely aggravates the aberration correction. Therefore it is difficult to provide an eyepiece optical system with a wide field-of-view, a long eye relief, and the added constraint of being well-corrected.

Two significant consequences result from the eyepiece having an external exit pupil. The fact that the eyepiece lacks an internal aperture stop makes correcting the imaging aberrations a very difficult task. Secondly, the eyepiece system not only must be well-corrected for the imaging aberrations, but it must also provide pupil imaging. Many lens systems are not relevant to eye piece design problems since pupil imaging is not required, i.e. photographic and telescopic objectives, relay lenses, etc. The eyepiece must image the pupils with adequately corrected pupil aberrations, which are entirely different from the commonly referred-to third order aberrations. These third order aberrations are often grouped together and referred to as the monochromatic aberrations. Specifically, the eyepiece must be well-corrected for spherical aberration of the exit pupil. A system that is well-corrected for spherical aberration is not necessarily well-corrected for spherical aberration of the exit pupil, and actually due to the techniques for aberration correction, often systems which are extremely well-corrected for the one are neglected for the other. The amount of spherical aberration of the exit pupil is dependent upon the field angle and therefore increases rapidly as the field-of-view is increased. If the pupil aberrations are not corrected, the pupil location may vary with field angle and wavelength or more likely will vary as a complex function of both. In these circumstances, not only is eyestrain induced upon the user, but severe vignetting of the field may occur as the eye shifts around. If the pupil aberration correction is extremely poor, vignetting may occur for all eye locations; this is known as the "kidney-bean effect". Therefore the eyepiece system must not only provide a sufficient eye relief, be well-corrected for monochromatic aberrations, chromatic aberrations, but also must be well-corrected for pupil aberrations and the chromatic variations thereof.

There are two general groups of visual optical instruments, and both offer magnifying power, but have significantly different features and configurations. Eyepieces are of the classical telescope type, or more explicitly as the group of visual systems that are coherently coupled. The other group, incoherently coupled optical systems, are similar to those described above but are different in that the back-end of the system re-images a second-generation image. In this latter group, an objective forms a real., internal image just as the previous group did. The essential difference is that the real image is stored, processed, or converted. Examples of this type of system are image-intensifying systems and thermal imagers. In many cases the image is then placed on a small screen. The back-end subsystem then views the screen and projects an image for the eye. These back-end systems sometimes are referred to as eyepieces. Unfortunately the terms "eyepiece", "ocular", and "magnifier" are used interchangeably. (Monocular magnifier when one eye views the image, biocular magnifier in the case where both eyes use the same system) A more clear distinction is to refer to eyepieces as those used in coherently coupled devices, and to use magnifier when referring to those used in incoherently coupled systems. There is a clear distinction between the two systems. For instance, in incoherently coupled systems, the internal image is re-imaged at a comfortable distance for the eye and is magnified, but the important difference is that there is no pupil imaging. This important feature clearly separates the two groups. While in magnifier designs, an exit pupil is referred to, this is merely a construction referring to the most likely axial position of the viewer's eye. Furthermore, in magnifiers there is no optical correction for the pupil aberrations. As an application, an eyepiece can be used as a monocular magnifier; the opposite is not necessarily the case.

Earlier versions of incoherently coupled visual optical instruments-incorporated eyepieces for use as magnifiers. Due to the significant differences in optical requirements, magnifier designs have evolved such that they no longer closely resemble eyepieces. Additionally, since the light emanating from the internal image is generated from a screen, the magnifier optical system needs to be color corrected only for the spectral characteristics of the screen. This spectral region tends to be significantly less than what is considered broadband illumination. For example, certain cathode ray tubes (CRT) display greenish images which have a spectral distribution of approximately 50 nm. The visible, broadband spectrum is approximately 200 nm. The larger the spectral band an optical system is correcting for, the more difficult. Thus, spectral correction in eyepiece systems is more difficult than for magnifiers.

It is a feature of this invention to provide eyepiece optical systems which use arrangements of refractive and diffractive elements which address the problems discussed above. Most notably, providing eyepieces are broadband, color-corrected eyepiece optical systems and which are comprised of all positively-powered elements, having a wide-field, a long eye relief (ER), and are well-corrected for spherical aberration of the exit pupil. Furthermore the eyepieces offer low distortion, and are also simultaneously well-corrected for lateral color and axial chromatic aberration, spherical aberration, spherochromatism, astigmatism, a flat sagittal image field, chromatic variation of pupil location, chromatic pupil spherical aberration, and chromatic distortion.

While providing for the above object imaging and pupil-imaging requirements, the eyepiece optical systems embodying the invention also provide the following advantages. The refractive elements of the eyepiece optical systems may be constructed of ordinary, common glass types, which are relatively inexpensive both in material costs and in machining costs. The eyepiece optical systems simultaneously have a long eye relief, a long back focal length, a wide-field, and a compact optical system (over 50% reduction in overall length— compared to the popular conventional eyepiece of Erfle—U.S. Pat. No. 1,478,704 issued Dec. 25, 1923). Moreover, eyepiece optical systems embodying the invention allow for scaling to lower f-numbers than readily obtainable with conventional eyepieces. Additionally, eyepiece optical systems embodying the invention allow for scaling other parameters such as focal length. The eyepieces according to this invention, in comparison to conventional eyepieces, have lower surface curvatures, fewer elements, and less material. These last features have the advantage that the eyepieces disclosed herein offer significant weight reductions when compared to conventional eyepieces (68% less than the Erfle design, for example). Due to the reduced amount of material and the reduced surface curvatures, the eyepiece optical systems can offer significant manufacturing cost reductions. These reductions can lead to lower glass material costs, tolerances which are less restrictive, and lighter-weight mounts.

Diffractive elements have been used in visual optical lens systems, primarily for eliminating chromatic aberration as a replacement for refractive lens systems. See, T. W. Stone, "Hybrid Diffractive-Refractive Telescope", SPIE Vol. 1212, Practical Holography IV (1990). Diffractive elements have been provided on refractive elements (refractive/diffractive) also primarily for chromatic aberration correction. See Spaulding & Morris, U.S. Pat. No. 5,161,040, issued Nov. 3, 1992.

Chen U.S. Pat. No. 5,151,823, issued Sep. 29, 1992, discloses a biocular eyepiece optical system which consists of refractive and diffractive elements. In accordance with generally accepted definition of magnifiers and eyepiece systems, as discussed above, Chen's design is actually a magnifier, particularly a biocular magnifier. A biocular magnifier is one which accommodates both eyes through one optical system. The Chen system is described for use with a CRT display. Thus, the system is not an "eyepiece" by virtue of the lack of pupil imaging correction therein.

Another Chen patent (U.S. Pat. No. 5,148,314, issued Sep. 15, 1992) discloses an optical system with a large aperture lens and an external exit pupil employing diffractive and refractive elements. Chen is again referring to a magnifier device because of the lack of pupil imaging correction.

The improvements in wide-angle eyepiece systems provided by the present invention will be more apparent by contrast with conventional refractive multi-element designs, rather than the diffractive/refractive magnifiers. Conventional wide-angle eyepiece designs, such as those described in patents U.S. Pat. No. 1,478,704 and Nagler, U.S. Pat. No. 4,525,035 issued Jun. 25, 1985 and shown in FIGS. 1 and 2 consist of several refractive elements to control aberrations while still maintaining sufficient eye relief and a wide field-of-view. Conventional wide-angle eyepieces employ several elements to sufficiently correct the eyepiece for aberrations. Aberrations that are particularly difficult to control are field curvature, distortion, lateral color, and pupil spherical aberration. As previously mentioned, maintaining a wide field angle and long eye relief leads to large aperture elements. The result of having eyepieces with several large aperture elements is that these systems are heavy. Along with the added weight is increased cost both in the optics and the mounts. In some systems with cost or weight constraints, optical performance may be compromised.

In eyepiece design, one of the more difficult design issues is correcting lateral chromatic aberration. This is an aberration which essentially must be accounted for at the outset of the design process. Unlike longitudinal chromatic aberration, lateral chromatic aberration becomes more difficult as the field angle is increased and is difficult to correct using conventional lens design techniques due to inherent features of eyepiece optical systems. An eyepiece optical system, due to its characteristic configuration, lacks symmetry of the principal or chief ray (a principal ray is defined as any ray originating from the object and having a height of zero in the aperture stop and pupils) about the aperture stop or a pupil. Therefore, in conventional designs, elements composed of glasses with significantly differing dispersion characteristics are coupled together to correct the chromatic aberrations. These are in the doublet elements 16 and 18 in FIG. 1, and 24 and 26 in FIG. 2. These doublet elements are of opposing optical power. In a first order sense, these elements oppose the task at hand, and thus have the effect (especially in systems where color is difficult to correct, e.g. eyepieces) of increasing the number of elements and increasing the weight of an optical system. Furthermore, the curvatures of the elements tend to be very strong as well. With stronger curvatures, other monochromatic aberrations become difficult to correct, and, as a result, more elements are often required to correct the system aberrations, such as the bi convex elements 20 in FIG. 1 and 28 and 30 in FIG. 2. Wide-angle eyepieces tend to require at least five elements, and in many cases six or more elements, to be well-corrected for the image-degrading aberrations and pupil aberrations. Due to constraints for weight, size, cost, etc. in some systems and applications, optical performance may be sacrificed.

Therefore in several circumstances eyepieces with improved features are required. These features include eyepieces that (in comparison to conventional designs) are lighter and more compact, have fewer elements, are better-optically-corrected, offer a wider-angle, and have a longer-eye relief. It is the principal object of this invention to provide improved eyepiece optical systems wherein these features are obtained.

It is a more specific object of this invention to provide improved eyepiece optical systems having the following features: an eye relief which is at least 80% of the focal length, well-corrected for field angles up to approximately 70° and minimized pupil spherical aberration. It is a still further object of the invention to provide improved eyepiece optical systems which are at least comparable in performance to conventional eyepiece designs while utilizing fewer elements, being more compact, and offering significant decreases in weight and cost.

Still another object of the invention is to provide improved eyepiece systems wherein the pupil of the system may be enlarged, which therefore allows for smaller f-numbers-a desirable feature in many applications.

A still further object of this invention, in comparison to other wide-angle, conventional eyepieces, is to provide improved eyepiece optical systems well-corrected over the visible, broadband spectrum while being comprised of only relatively weak positive elements.

Other objects of the invention are to provide improved eyepiece systems having a long working distance, or in terms of optical specifications, a long back focal length, and to provide this extended working distance while still maintaining a compact system, i.e. a reduced overall length (from first surface of the lens element closest to the eye position to image plane or from eye position to image plane.)

Briefly described, an improved eyepiece optical system embodying the invention has three groups of surfaces which are provided by optical elements and are located along an optical axis between an image plane which may be formed by an objective lens system and the eye (the exit pupil of the eyepiece) at least one of the groups which is closest to the image plane is a refractive/diffractive doublet, while an intermediate group is a bi-or equi-convex element.

More specifically, a first embodiment of the invention is a three-element eyepiece optical system that comprises (from the eye side) a first group consisting of a refracting, meniscus, positive element with a surface concave toward the eye, a second group that comprises a bi-convex element having a refracting convex surface and a refracting convex surface, and a third group having a refractive element and a diffractive element (each of positive power).

In another embodiment, the three-element eyepiece optical system comprises a first group with a refractive element having a convex surface and a positive diffractive element, a second group containing an equi-convex element having a refracting convex surface and a second refracting convex surface, and a third group composed of a refracting positive element having a convex surface and a diffractive element with positive focusing power.

Both embodiments of the eyepiece optical system provide eyepieces employing fewer elements and being more compact than optically-comparable, conventional eyepiece designs. The eyepiece is well-corrected over the visible, broadband spectrum. Scaling of the eyepiece constructional parameters is permitted.

The foregoing objects, features, benefits, and advantages of this invention will become more apparent from the following detailed description of presently preferred embodiments thereof, when read in connection with the accompanying drawings, the Figures of which are briefly described as follows:

FIG. 1 is a cross-sectional view of an eyepiece lens system according to the second embodiment of the invention U.S. Pat. No. 1,478,704. The apparent field-of-view is approximately 70°.

FIG. 2 is a cross-section view of an eyepiece lens system according to the design disclosed in the U.S. Pat. No. 4,525,035. The apparent field-of-view is approximately 65°-70°.

Figure 5:
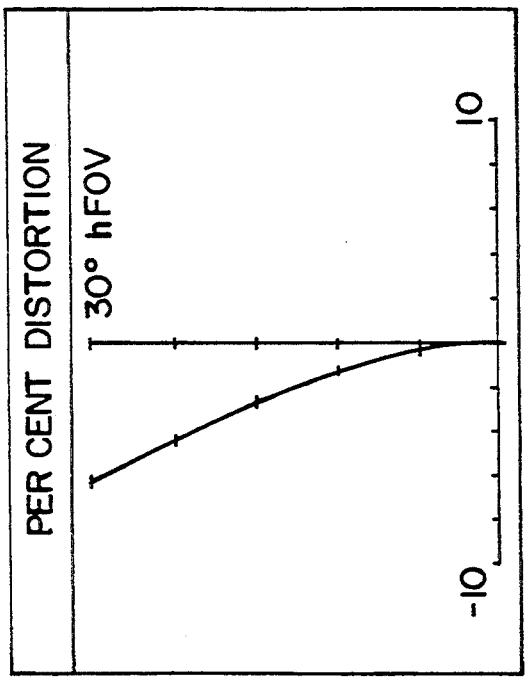

FIG. 5 is a plot of the per cent distortion of the Erfle eyepiece according to U.S. Pat. No. 1,478,704.

Figure 6:
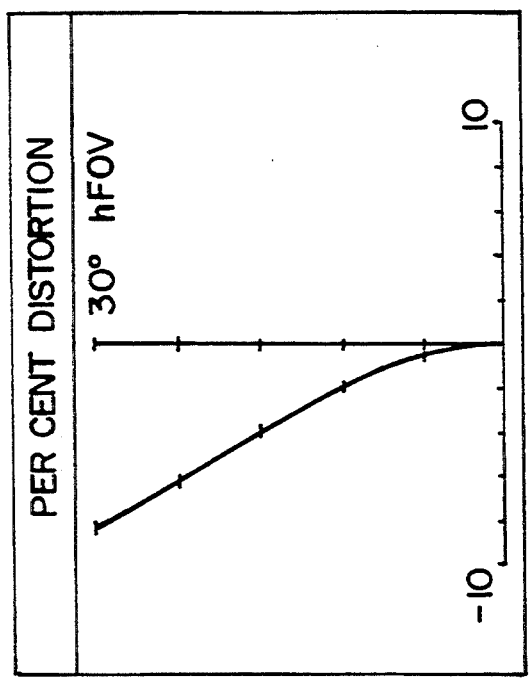

FIG. 6 is a plot of the per cent distortion of the eyepiece optical system in the first embodiment.

Figure 7:
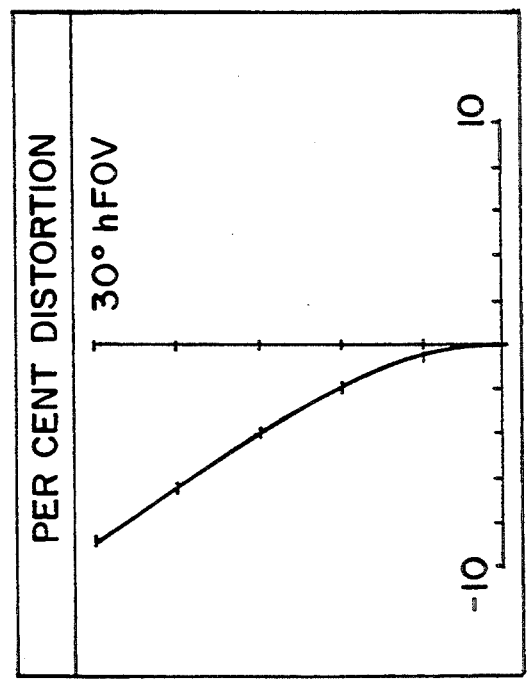

FIG. 7 is a plot of the per cent distortion of the eyepiece optical system in the second embodiment.

Figure 8:
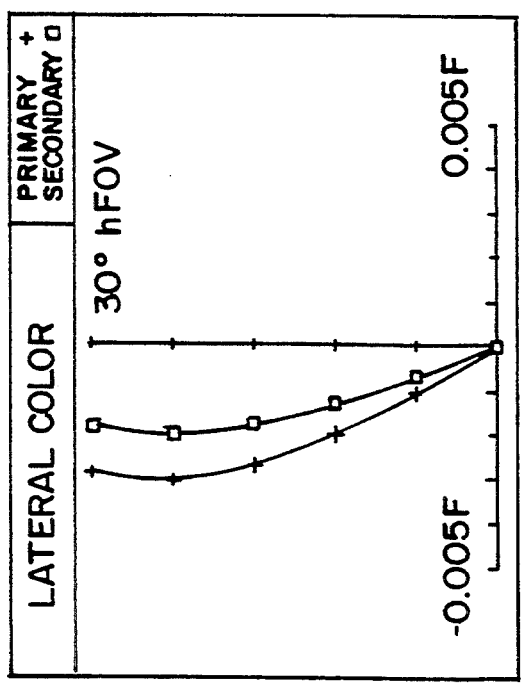

FIG. 8 is a plot of the primary (486 nm to 656 nm) and secondary (486 nm to 588 nm) lateral color of the Erfle eyepiece according to U.S. Pat. No. 1,478,704.

Figure 9:
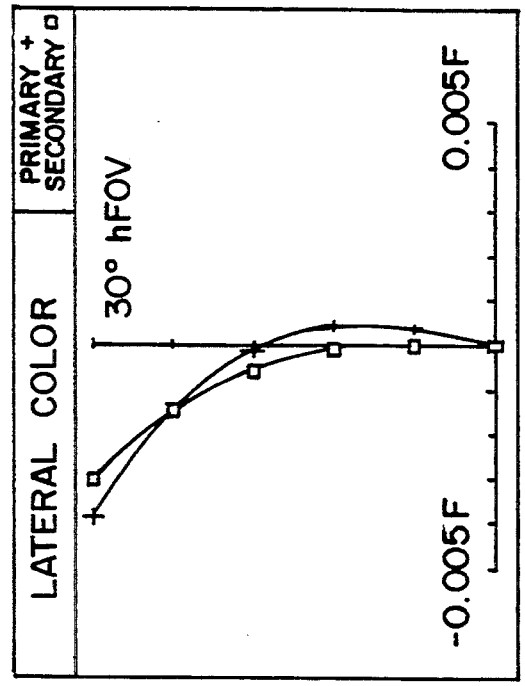

FIG. 9 is a plot of the primary (486 nm to 656 nm) and secondary (486 nm to 588 nm) lateral color of the eyepiece optical system in the first embodiment.

Figure 10:
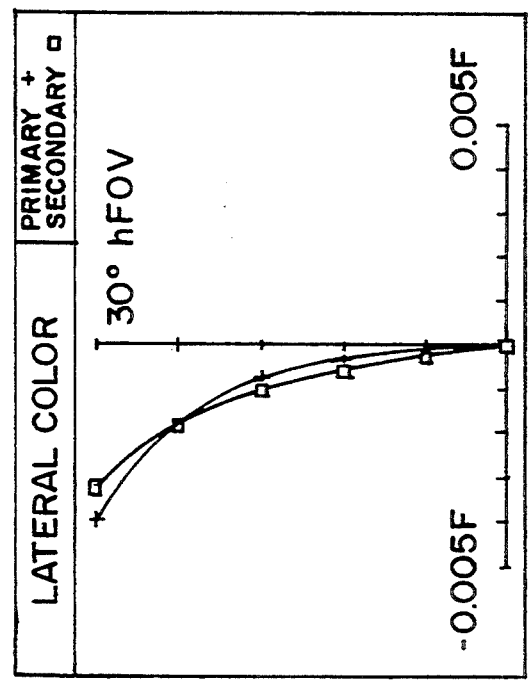

FIG. 10 is a plot of the primary (486 nm to 656 nm) and secondary (486 nm to 588 nm) lateral color of the eyepiece optical system in the second embodiment.

Figure 11:
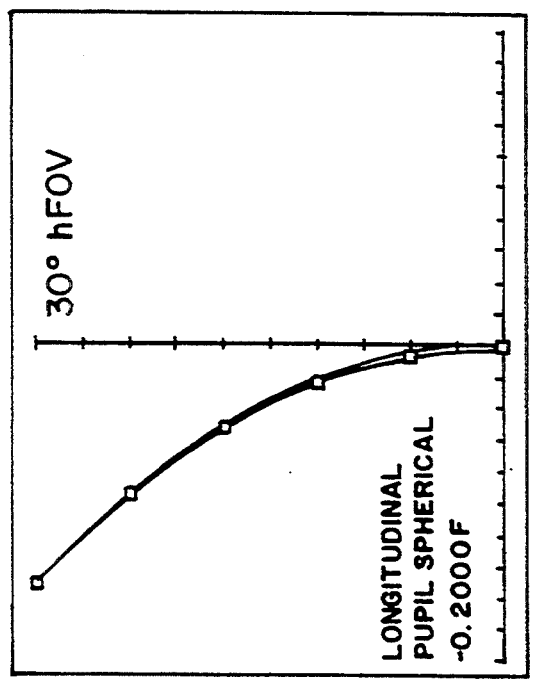

FIG. 11 is a plot of the longitudinal spherical aberration of the exit pupil in three wavelengths (486 nm, 588 nm, 656 nm) for the Erfle eyepiece according to U.S. Pat. No. 1,478,704.

Figure 12:
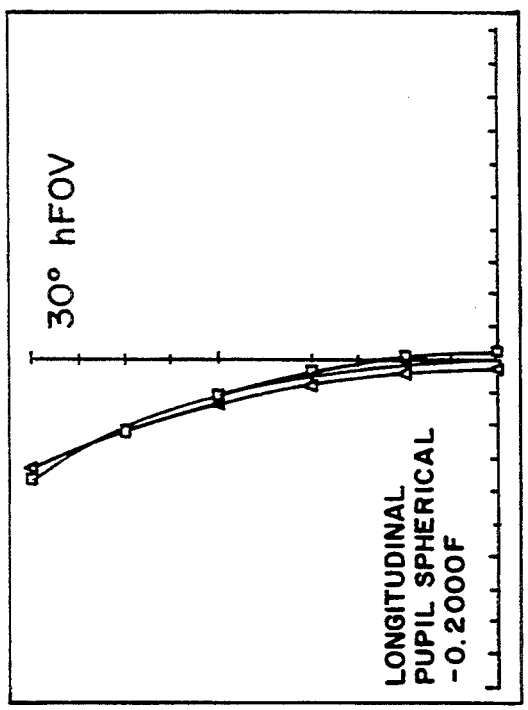

FIG. 12 is a plot of the longitudinal spherical aberration of the exit pupil in three wavelengths (486 nm, 588 nm, 656 nm) for the eyepiece optical system in the first embodiment.

Figure 13:
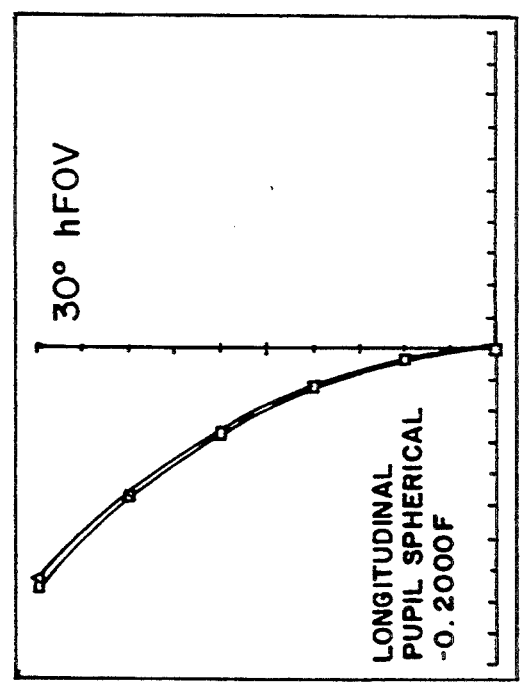

FIG. 13 is a plot of the longitudinal spherical aberration of the exit pupil in three wavelengths (486 nm, 588 nm, 656 nm) for the eyepiece optical system in the second embodiment.

In FIGS. 5 to 8, hFOV is the half field of view angle with 30° being the maximum hFOV and the scale being in 6° increments. The percent distortion is shown as negative for under corrections; however, they appear to the eye as over correction. The scale for percent distortion is in 2% increments. The scale in FIGS. 8 to 10 for lateral color (chromatic aberration) is in 0.001 increment of the focal length 7. In FIGS. 11 to 13 the scale for longitudinal pupil spherical aberration is in 0.02 increments of the focal length 7. The curves are plotted along triangles, squares and pluses for the wavelengths of 656 nm, 486 nm and 588 nm, respectively.

Figure 1:
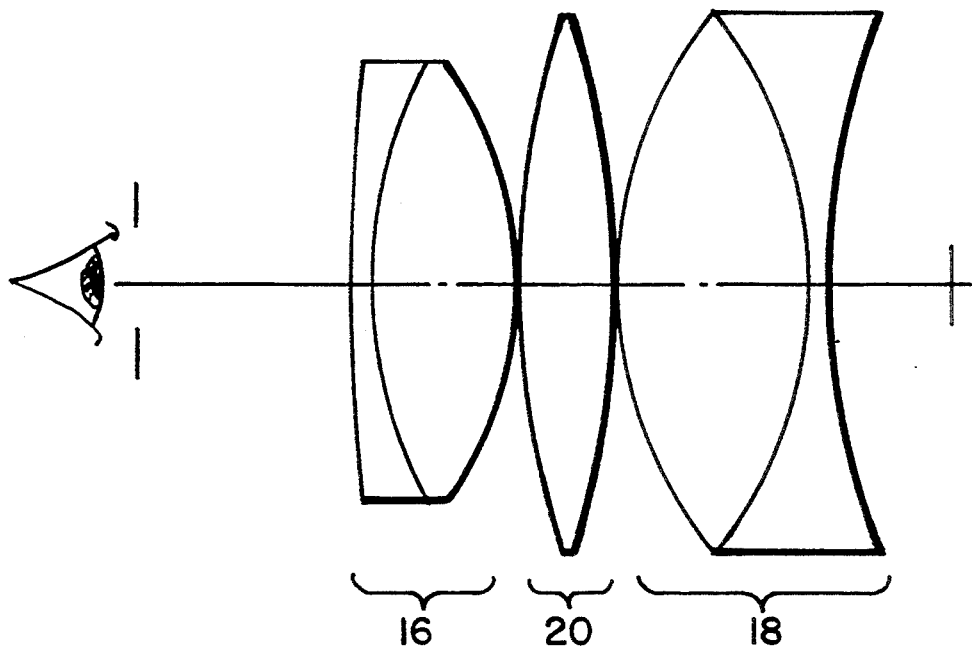
Figure 2:
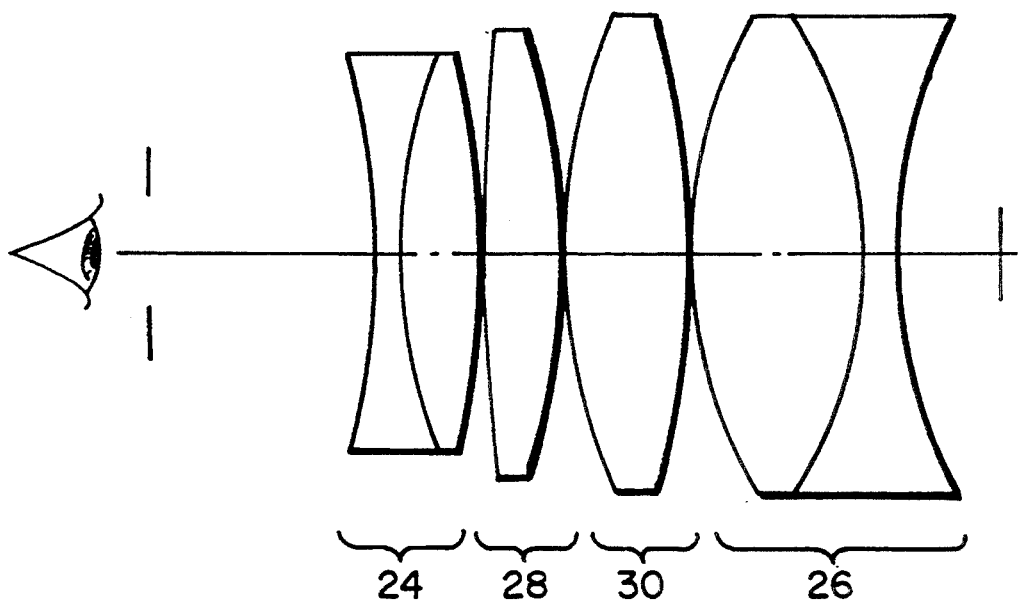
Figure 3:
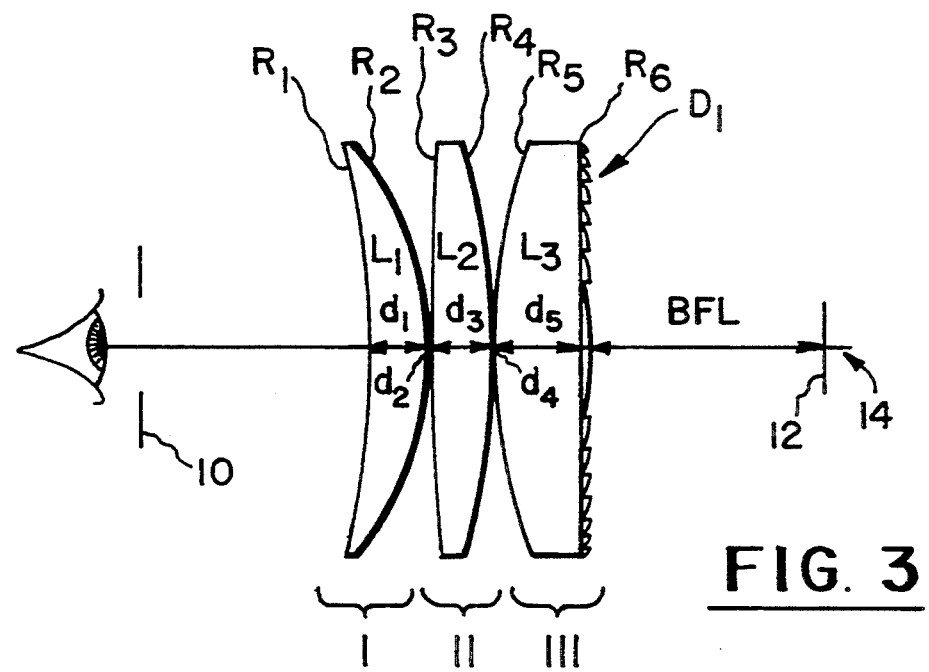
FIG. 3 is a cross-sectional view of an eyepiece optical system having an apparent field-of-view of at least approximately 70° according to the first embodiment of this invention.

Refer first to FIG. 3, which shows the first embodiment of this invention, which is a three-element eyepiece optical system having lens groups I, II, III, from the eye side. The first group I comprises a refracting, meniscus, positive element $L_1$ with a surface concave $R_1$ toward the eye, a second group II that comprises a hi-convex element $L_2$ having a refracting convex surface $R_3$ and a second refracting convex surface $R_4$, and a third lens group III that comprises a refractive element $L_3$ and a diffractive element $D_1$ (each of positive power). In another embodiment, FIG. 4, a three-element eyepiece optical system comprises a first group I with refractive element $L_1$ having a convex surface $R_2$ and a positive diffractive element $D_1$, a second group II containing an equi-convex element $L_2$ having a refracting convex surface $R_3$ and a second refracting convex surface $R_4$, and a third lens group III composed of a refracting positive element $L_3$ having a convex surface $R_5$ and a diffractive element $D_2$ with positive focusing power. The groups are arranged along an optical axis between an exit pupil 10, shown as an aperture stop near the eye, and an image plane 12 where the image of the object as focussed by an objective lens system is located. The last or back surface of the system which defines the diffractive surface is spaced from the image plane by the back focal length (BFL) of the eyepiece system.

Both embodiments are well-corrected to a field of at least approximately 70°. The features of these embodiments are a long eye relief—at least 0.80 F. (where F represents the total focal length of the eyepiece), an external image plane, a long working distance (BFL), an eyepiece optical system considerably more compact than conventional designs (which can be at least 50%), an eyepiece optical system with fewer elements and thus reduced weight and cost of manufacture, and optical imaging performance comparable to or better than that of conventional designs. The eyepiece optical systems are simultaneously well-corrected for the following aberrations and specifications: lateral chromatic and longitudinal chromatic aberration, spherical aberration, coma, spherochromatism, astigmatism, flat image field, distortion, chromatic distortion, pupil spherical aberration, chromatic variation of pupil position, chromatic variation of pupil spherical.

The herein illustrated eyepiece optical system embodiments are well-corrected for color over the visible, broadband spectrum, while only employing all-positive elements. This last feature is desirable in that the eyepiece is then comprised of elements with reduced curvatures and reduced thicknesses compared to conventional designs. Not only does this have the benefit of reducing weight and lowering fabrication costs, but also allows the system to be opened up to faster f-numbers, such that the design may be applicable to many applications.

As indicated above, a unique advantage of these embodiments is that they allow scaling of the system pupil to allow for faster (i.e. lower) f-numbers. The reasons for this are not only the weak curvatures of the refractive surfaces, but also the long working distances of the optical systems. In some instances, as the f-number of an eyepiece is increased, the back focal length decreases and the image plane becomes increasingly closer to the last lens surface. Therefore if the application requires that the f-number be small, it is beneficial to use an eyepiece that has a large BFL. For example the working distance of the first embodiment is 0.75 F.

In the first embodiment (FIG. 3), the diffractive element $D_1$ provides correction for chromatic aberrations. The Abbe $v$-number of the diffractive element is negative. This is not a design parameter, but rather a fixed value determined by the physics of diffraction gratings. The diffractive element $D_1$ is also inherently very strongly dispersive. Therefore the power of the element does not need to be very strong to correct the chromatic aberrations. The power of the diffractive element is approximately 8% of the entire eyepiece. The higher order terms of the phase function of the diffractive element are used to help correct distortion, pupil spherical aberration, and also to provide a flat sagittal image field. The power of the eyepiece is distributed throughout the three groups, with slightly more power in the refractive element of group I. The powers of groups II and III are approximately equal, and each comprise approximately 30% of the power of the overall eyepiece. The algebraic sum of the axial thicknesses of the elements and the airspaces $d_1$, $d_2$, $d_3$, $d_4$, $d_5$ is 0.68 F.

Figure 4:
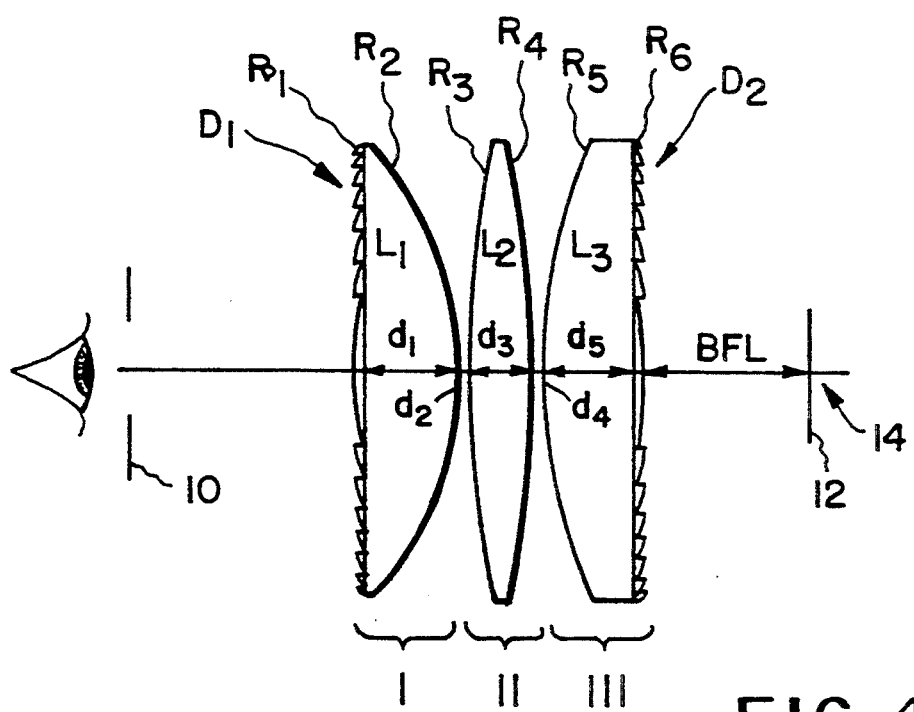
FIG. 4 is a cross-sectional view of an eyepiece optical system having an apparent field-of-view of at least approximately 70° according to the second embodiment of this invention.

In the second embodiment FIG. 4, the color correction is provided by the two diffractive elements $D_1$ and $D_2$. The diffractive elements in this embodiment are relatively weak. The diffractive element $D_1$ in group I comprises approximately 5% of the total eyepiece power, and the diffractive element $D_2$ in group III comprises approximately 2% of the total eyepiece power. The higher order terms in the phase function of the diffractive element $D_1$ in group I are utilized to aid in correcting distortion, pupil spherical aberration, and in providing a flat sagittal field. The power of the eyepiece is distributed throughout the three groups, with slightly more power in the refractive element $L_1$ of group I. The powers of groups II and III are approximately equal, and each comprise approximately 25–30% of the power of the overall eyepiece. The algebraic sum of the axial thicknesses of the elements and the airspaces $d_1$, $d_2$, $d_3$, $d_4$, $d_5$ is 0.97 F.

In each embodiment, the diffractive elements may be mounted on surfaces of any general shape, such as spherical, although here planar substrates have been chosen to ease fabrication. Furthermore, as previously indicated scaling of the physical parameters is allowed so as to achieve eyepieces of different focal lengths, f-numbers, etc. When the field-of-view is to be extended beyond 70°, groups I and II in the first embodiment may be split into three elements and group II in the second embodiment may be split into two elements to provide comparable optical performance.

Numerical examples of lens systems in accordance with the preferred embodiments are listed below.

EXAMPLE 1

| $f = 1.0$ | BFL = 0.80 | F/2.5 | Apparent field-of-view 70° |
|---|---|---|---|
| $R^1 = -2.70$ | $d^1 = 0.20$ | $n^1 = 1.517$ | $n = 64.17$ |
| $R^2 = -0.97$ | $d^2 = 0.02$ | | |
| $R^3 = 7.86$ | $d^3 = 0.20$ | $n^2 = 1.517$ | $n = 64.17$ |
| $R^4 = -2.15$ | $d^4 = 0.01$ | | |
| $R^5 = 1.75$ | $d^5 = 0.27$ | $n^3 = 1.517$ | $n = 64.17$ |
| $R^6$ = infinity | | | |
| $D^1$ = diffractive lens | | | |

Eye relief 0.80

EXAMPLE 2

| $f = 1.0$ | BFL = 0.80 | F/2.5 | Apparent field-of-view 70° |
|---|---|---|---|
| $D_1$ = diffractive lens | | | |
| $R_1$ = infinity | $d_1 = 0.34$ | $n_1 = 1.540$ | $n = 59.71$ |
| $R_2 = -1.209$ | $d_2 = 0.03$ | | |
| $R_3 = 3.9$ | $d_3 = 0.23$ | $n_2 = 1.517$ | $n = 64.17$ |
| $R_4 = -3.9$ | $d_4 = 0.03$ | | |
| $R_5 = 1.846$ | $d_5 = 0.34$ | $n_3 = 1.540$ | $n = 59.71$ |
| $R_6$ = infinity | | | |
| $D_2$ = diffractive lens | | | |

Eye relief 0.80 from the foregoing description, it will be apparent that there have been provided improved wide angle eyepiece optical systems. Variations and modifications in the herein described systems, within the scope of the invention will undoubtedly suggest themselves to those skilled in the optical arts. Accordingly, the foregoing description should be taken as illustrative and not in a limiting sense.

We claim:

1. A wide angle optical eyepiece system, which comprises a plurality of lens elements which define first, second and third groups of surfaces, all but at least one of said surfaces of said groups being refracting and said at least one surface being diffracting, said groups of surfaces being disposed along an optical axis, a surface of said first group being a front surface of said system which faces a location for the eye of the observer which is the exit pupil of said system and is spaced therefrom by an eye relief, a surface of said third group being a back surface of said system which is spaced from image plane by a back focal length, and said diffractive surface having sufficient power and refractive surfaces having sufficient curvature to provide said eye relief which is at least 80% of the focal length of said system and corrections of aberration, including spherical aberration at said exit pupil over a field angle of at least about 70° at said exit pupil.

2. The eyepiece system according to claim 1 wherein said elements provide zero power or positive power.

3. The eyepiece system according to claim 1 wherein said back surface is diffracting and defines a zone plate lens.

4. The eyepiece system according to claim 3 wherein said first group has a refracting surface facing and concave toward said exit pupil and is a meniscus element, said second group has refractive convex surfaces and is a bi-convex element, and third group has a refractive surface of positive power and said back diffractive surface.

5. The eyepiece system according to claim 4 wherein said element having said diffracting surface has an Abbe ʋ-number which is negative and defines a lens having positive power which is about 8% of the power of said eyepiece system.

6. The eyepiece system according to claim 4 wherein the power of the system is distributed among said first, second and third grounds and said first group has more power than either of said second and third groups.

7. The eyepiece system according to claim 6 wherein the powers of said second and third groups are approximately equal and each have about 30% of the power of the system.

8. The eyepiece system according to claim 4 wherein said first group is a meniscus lens of thickness $d_1$ along the optical axis, said second group is a bi-convex lens of distance $d_3$ along the optical axis, and said third group is a plano convex lens having said back diffractive lens on the plano surface thereof and which is of a thickness $d_5$ along the optical axis, said meniscus lens and said bi-convex lens being spaced by a distance $d_2$ along said optical axis, said hi-convex lens and plano-convex lens being spaced by a distance $d_4$ along said optical axis, and the sum of said distances $d_1$, $d_2$, $d_3$, $d_4$ and $d_5$ being approximately 0.68 F. where F is the focal length of said system.

9. The eyepiece system according to claim 1 wherein said back surface and said front surface are both diffracting and define zone plate lenses.

10. The eyepiece system according to claim 1 wherein said first group has said front diffracting surface and a convex refracting surface, said second group has convex refracting surfaces and is an equi-convex element, and said third group has a refracting surface with positive power and the said front diffracting surface.

11. The eyepiece system according to claim 10 wherein said front and back diffracting surface lenses provide correction of longitudinal and lateral chromatic aberration and said front diffracting surface is corrective of said spherical aberration of said exit pupil and remaining field aberrations.

12. The eyepiece system according to claim 10 wherein said front and back diffracting surface lenses provide approximately 5% and 2% of the power of said system, respectively.

13. The eyepiece system according to claim 12 wherein the second and third groups have about equal power of about 25–30% of the power of said system.

14. The eyepiece system according to claim 10 wherein said first group is a first plano convex lens which provides said front diffracting surface on the plano surface thereof and said convex refracting surface of said first group, the thickness of said first plano convex lens along said optical axis being $d_1$, the thickness of said equi-convex element which provides said second group along said optical axis being $d_3$, the said third group is a second plano convex lens with said back diffracting surface being on the plano surface thereof, the thickness of said second plano convex lens being $d_5$, the distance along said optical axis of said first plano-convex element being $d_2$, the distance along said optical axis of said equi-convex element from said second plano convex lens being $d_3$, and the sum of $d_1$, $d_2$, $d_3$, $d_4$, and $d_5$ being approximately 0.97 F., where F is the focal length of said system.

15. The eyepiece system according to claim 1 wherein said second group has a pair of convex refracting surfaces one facing said first group and the other facing said third group.

* * * * *